United States Patent [19]

Farrell et al.

[11] Patent Number: 4,770,944

[45] Date of Patent: * Sep. 13, 1988

[54] POLYMERIC STRUCTURE HAVING IMPROVED BARRIER PROPERTIES AND METHOD OF MAKING SAME

[75] Inventors: Christopher J. Farrell, Arlington Heights; Boh Tsai, Rolling Meadows; James A. Wachtel, Buffalo Grove, all of Ill.

[73] Assignee: American Can Company, Greenwich, Conn.

[*] Notice: The portion of the term of this patent subsequent to Oct. 4, 2000 has been disclaimed.

[21] Appl. No.: 538,106

[22] Filed: Oct. 3, 1983

Related U.S. Application Data

[63] Continuation-in-part of Ser. No. 418,199, Sep. 15, 1982, Pat. No. 4,425,410, which is a continuation-in-part of Ser. No. 101,703, Dec. 10, 1979, Pat. No. 4,407,897.

[51] Int. Cl.$^4$ ............................................. B32B 27/08
[52] U.S. Cl. ............................... 428/474.4; 428/516; 428/518; 428/523; 528/499

[58] Field of Search ...................... 518/499; 428/474.4, 428/522, 523, 516, 518

[56] References Cited

U.S. PATENT DOCUMENTS

| | | | |
|---|---|---|---|
| 3,989,677 | 11/1976 | Brassat et al. | 528/499 |
| 4,104,438 | 8/1978 | Angelo et al. | 428/474.4 |
| 4,281,045 | 7/1981 | Sumi et al. | 428/523 |
| 4,363,840 | 12/1982 | Roullet et al. | 428/516 |
| 4,407,873 | 10/1983 | Christensen et al. | 428/516 |
| 4,407,897 | 10/1983 | Farrell et al. | 428/516 |
| 4,425,410 | 1/1984 | Farrell et al. | 428/516 |
| 4,451,512 | 5/1984 | Yazaki et al. | 428/36 |
| 4,464,443 | 8/1984 | Farrell et al. | 428/516 |

Primary Examiner—Edith Buffalow
Attorney, Agent, or Firm—Paul R. Audet

[57] ABSTRACT

A polymeric structure having an oxygen barrier layer (e.g., ethylene-vinyl alcohol copolymer) is heated in the presence of moisture to improve its resistance to oxygen and moisture penetration. A drying agent is incorporated in the multi-layer structure to control the rate of water penetration to, and the amount of water in, the barrier layer.

70 Claims, 6 Drawing Sheets

POLYMERIC STRUCTURE HAVING IMPROVED BARRIER PROPERTIES AND METHOD OF MAKING SAME

RELATED APPLICATIONS

This application is a continuation-in-part of application Ser. No. 418,199, filed Sept. 15, 1982 now U.S. Pat. No. 4,425,410, which is in turn a continuation-in-part of application Ser. No. 101,703, filed Dec. 10, 1979 now U.S. Pat. No. 4,407,897.

FIELD OF INVENTION

Polymeric films and multi-layer polymeric structures are increasingly used as packaging materials for foodstuffs, medicinal products and a host of other items. Flexible polymer films and multi-layer polymeric structures are widely used for making pouches, wrappers, bags, thermoformed containers and injection blow molded containers for packaging various foods. Such packaged foods are usually thermally sterilized for safety and health purposes.

In packaging many products, oxygen permeability is of paramount consideration and, therefore, the multi-layer structures or films used for packaging of such products must be sufficiently impermeable to oxygen to prevent degradation of the packaged products, particularly during their storage.

Ethylene-vinyl alcohol copolymers are thermoplastic and melt-extrudable polymers with known oxygen impermeability and resistance to oil. However, these copolymers are permeable to moisture, and their oxygen permeability increases as their moisture content is increased. Therefore, in order to protect the ethylene-vinyl alcohol copolymer layer from moisture, it is usually buried between outer and inner layers of moisture barrier layers such as polyethylene, polypropylene or blends thereof.

Ethylene-vinyl alcohol copolymers are considerably more expensive than other polymers which are commonly used as packaging materials. However, in making a multi-layer laminate suitable as packaging material, a very thin layer of ethylene-vinyl alcohol in the laminate structure affords the necessary resistance to oxygen permeation, with the outer and inner polyolefin layers providing the requisite structural integrity and moisture resistance. Typically, these polyolefin layers are bonded to the intermediate ethylene-vinyl alcohol copolymer layer by a suitable adhesive layer.

In order to prevent moisture penetration in the ethylene-vinyl alcohol copolymer layer in a multi-layer polymeric structure, drying agents (desiccants) may be incorporated in the laminate structure, usually in the layer proximate to the ethylene-vinyl alcohol copolymer layer. A variety of such desiccants are disclosed and their effects described in said U.S. application Ser. No. 418,199, filed Sept. 15, 1982, the disclosure of which is fully incorporated herein by reference.

Efforts have been made in the past to improve oxygen resistance of ethylene-vinyl alcohol copolymers. For example, U.S. Pat. No. 4,294,935 which issued to Yuji Kodera et al. on Oct. 13, 1981 suggests that by increasing the orientation of ethylene-vinyl alcohol copolymer films, as well as increasing their degree of crystallinity, the gas barrier properties of these films will be less adversely affected by moisture. The method described in this patent involves biaxially or multiaxially orienting the ethylene-vinyl alcohol copolymer films and, if necessary, heating the stretched film at a temperature between 100° C. and a temperature which is lower than the melting point of the copolymer by 10° C. Heat treatment of the film is said to promote hydrogen bonding and increases the degree of crystallinity.

U.S. Pat. No. 4,082,854 which issued to Yamada et al. on Apr. 4, 1978 discloses that the resistance to oxygen permeation of ethylene-vinyl alcohol copolymer is improved by heat treatment under specified time and temperature conditions which cause a subsidiary endothermic peak to appear in the so-called differential thermal analysis (DTA) curve of the copolymer. The heat treatment of the film in this patent, however, is under dry conditions. This type of heat treatment is sometimes referred to as "dry annealing."

Other patents of interest and by way of general background in this area include U.S. Pat. Nos. 3,061,884; 3,124,415; 3,560,325; 3,907,675; 3,957,941: 3,985,849: 4,230,654 and 4,303,711.

While dry annealing of ethylene-vinyl alcohol copolymer by the method described in the aforementioned Yamada et al. patent results in some improvement in its resistance to oxygen permeation, this improvement is modest in most instances. Where more oxygen impermeability is required, dry annealing has not provided a satisfactory solution.

It is, accordingly, an object of this invention to improve the resistance of ethylene-vinyl alcohol copolymers and polyvinyl alcohol to oxygen permeation.

It is a further object of this invention to provide a method of improving the oxygen resistance of polyvinyl alcohol and ethylene-vinyl alcohol copolymers.

It is also an object of this invention to provide films of polyvinyl alcohol and ethylene-vinyl alcohol copolymers and multi-layer polymeric structures comprising a layer of polyvinyl alcohol or ethylene-vinyl alcohol copolymer, wherein the resistance to oxygen permeation of the film or the multilayer polymeric structure is sufficiently improved to meet the stringent demands of the food packaging industry whenever high resistance to oxygen permeation is required.

The foregoing and other objects of the present invention will become more apparent from the following detailed description and the drawings which illustrate the principles and advantages of this invention.

SUMMARY OF THE INVENTION

A film of polyvinyl alcohol or ethylene-vinyl alcohol copolymer, or a polymeric structure (e.g., laminate) comprising a film of polyvinyl alcohol or ethylene-vinyl alcohol copolymer, is heated in the presence of moisture (e.g., in a humid environment) to improve the resistance of the film or the polymeric structure to oxygen permeation. This method, which is sometimes referred to herein as "wet annealing" is more effective than "dry annealing" in increasing the oxygen resistance of such films or polymeric structures.

Improved resistance to oxygen permeability is realized by maintaining low initial water content in the polyvinyl alcohol or the ethylene-vinyl alcohol copolymer film. In order to prevent moisture permeation into the film, and hence maintaining low water level therein during the wet annealing process, a drying agent (desiccant) can be incorporated in the film, or, in the case of a multi-layer structure, in the layer proximate to the oxygen-resistant layer.

DETAILED DESCRIPTION OF THE INVENTION

Oxygen barrier properties of polyvinyl alcohol films, ethylene-vinyl alcohol copolymer films and polymeric structure comprising such films, is improved by wet annealing, i.e., heating the polymeric structure in the presence of moisture, e.g., in a humid environment, the wet annealing is generally carried out at elevated temperatures, usually from about 210° F. to about 250° F., in an atmosphere of from about 20 to about 100 percent relative humidity. Wet annealing has been found to significantly increase the resistance of such films and polymeric structures to oxygen permeation as compared to dry annealing. Improvement is also realized in the moisture resistance of these films and polymeric structures comprising such films.

When ethylene-vinyl alcohol copolymer is dry annealed, as by the method described in the aforementioned Yamada et al. patent, in addition to the main endothermic peak, a second or "subsidiary" endothermic peak appears in the copolymer corresponding to a melting point of 103° C. (376° K.). The appearance of such subsidiary melting point is associated with the appearance of a secondary crystalline structure and is said to signify improvement in oxygen barrier properties of the copolymer. Yamada et al. further disclose that this subsidiary endothermic peak is due to the melting of the polyethylene or the polymer chain of ethylene-rich segments present in the ethylene-vinyl alcohol copolymer. The gas permeation is improved as a result of crystallization of the polyethylene portion of the ethylene-rich segments present in the copolymer. (See column 4, lines 46–62).

Figure 1:
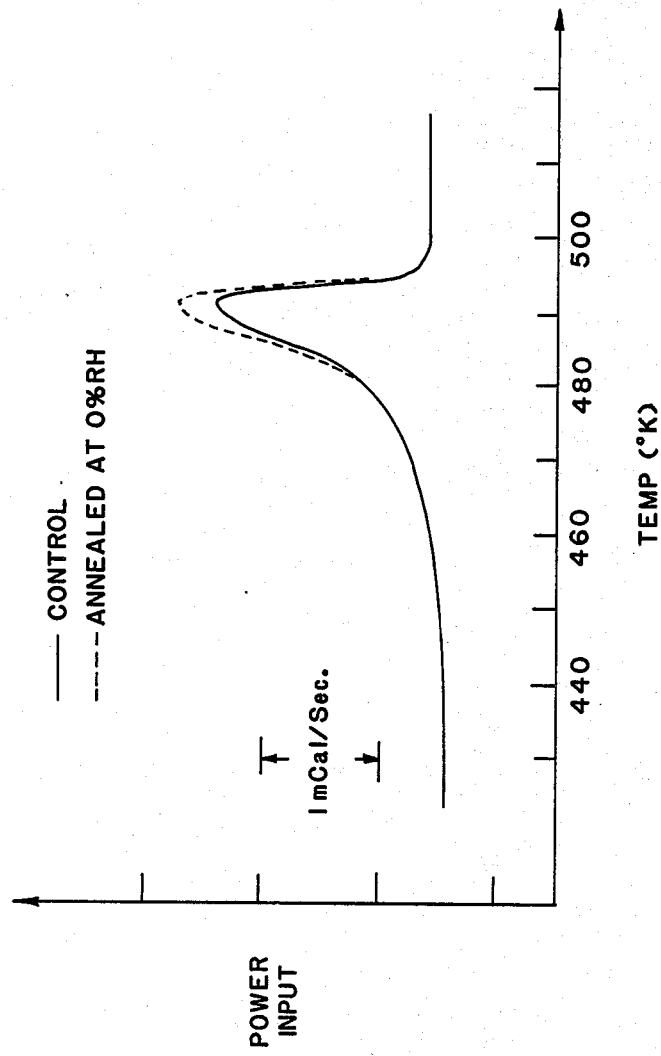
FIG. 1 shows two differential scanning calorimetric curves for a film of polyvinyl alcohol, illustrating the effect of dry annealing on the heat of fusion, and hence, crystallinity of the film.
Figure 2:
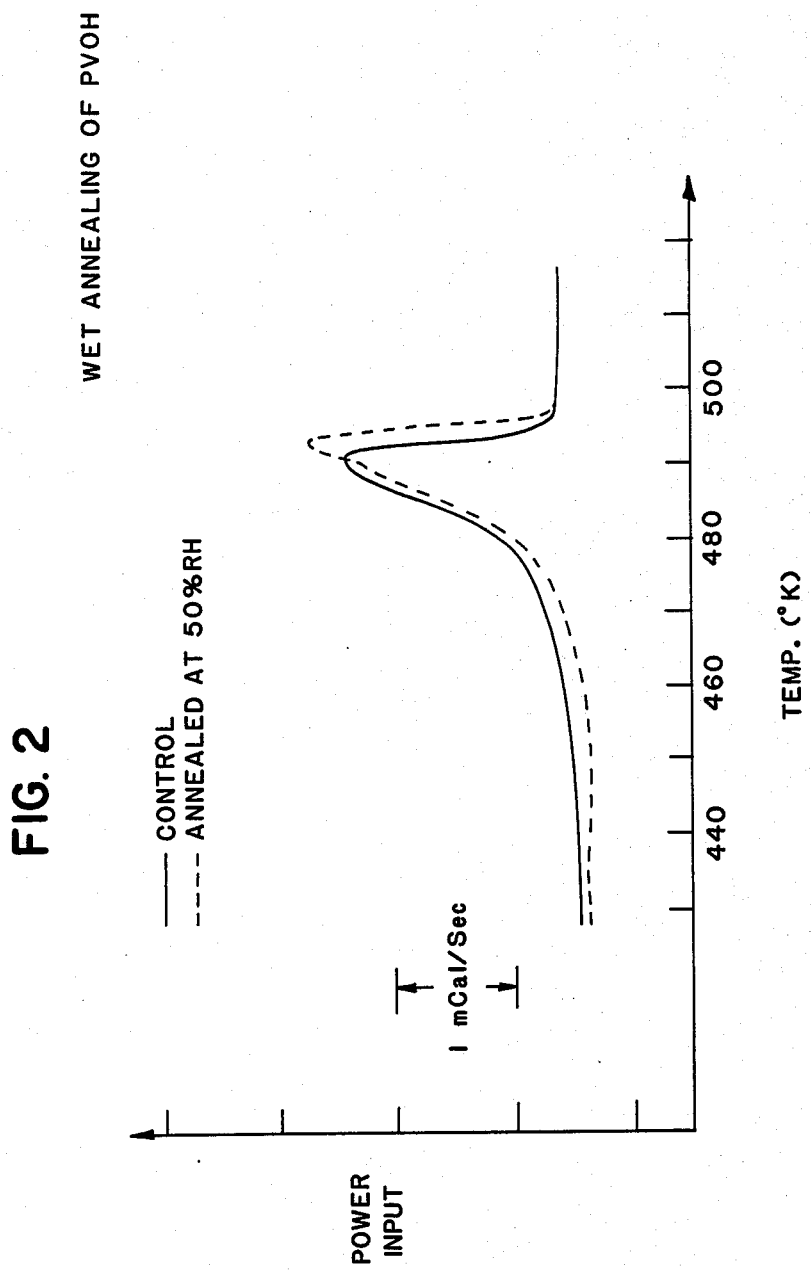
FIG. 2 is similar to FIG. 1, but illustrates the effect of wet annealing of the polyvinyl alcohol film.

It has been found that while dry annealing only changes the amorphous structure of the polymer to a crystalline structure, wet annealing, on the other hand, changes the crystalline structure and results in a higher primary crystalline melting peak. Consequently, further and significant improvement is realized in oxygen permeability of the polymer. Thus, referring to FIG. 1, it will be seen that dry annealing of a film of polyvinyl alcohol at 250° F. for two hours results in a modest increase in the heat of fusion as compared with the unannealed film, i.e., a change of from 11.1 mcal per gram to 11.6 mcal per gram. The shapes of the two curves are otherwise essentially the same and the peak melting points of the annealed and unannealed samples are both 492° K. By contrast, and with reference to FIG. 2, wet annealing of polyvinyl alcohol film at 250° F., for two hours and in a 50 percent relative humidity (R.H.) environment, not only alters the shapes of the annealed curves, but results in a higher main melting peak of 494° F., a difference which is regarded to be significant. Thus, wet annealing changes the crystalline structure of the polyvinyl alcohol film resulting in a more perfect crystal structure and higher melting peak, which are associated with less oxygen permeability and hence improved oxygen barrier properties.

Figure 3:
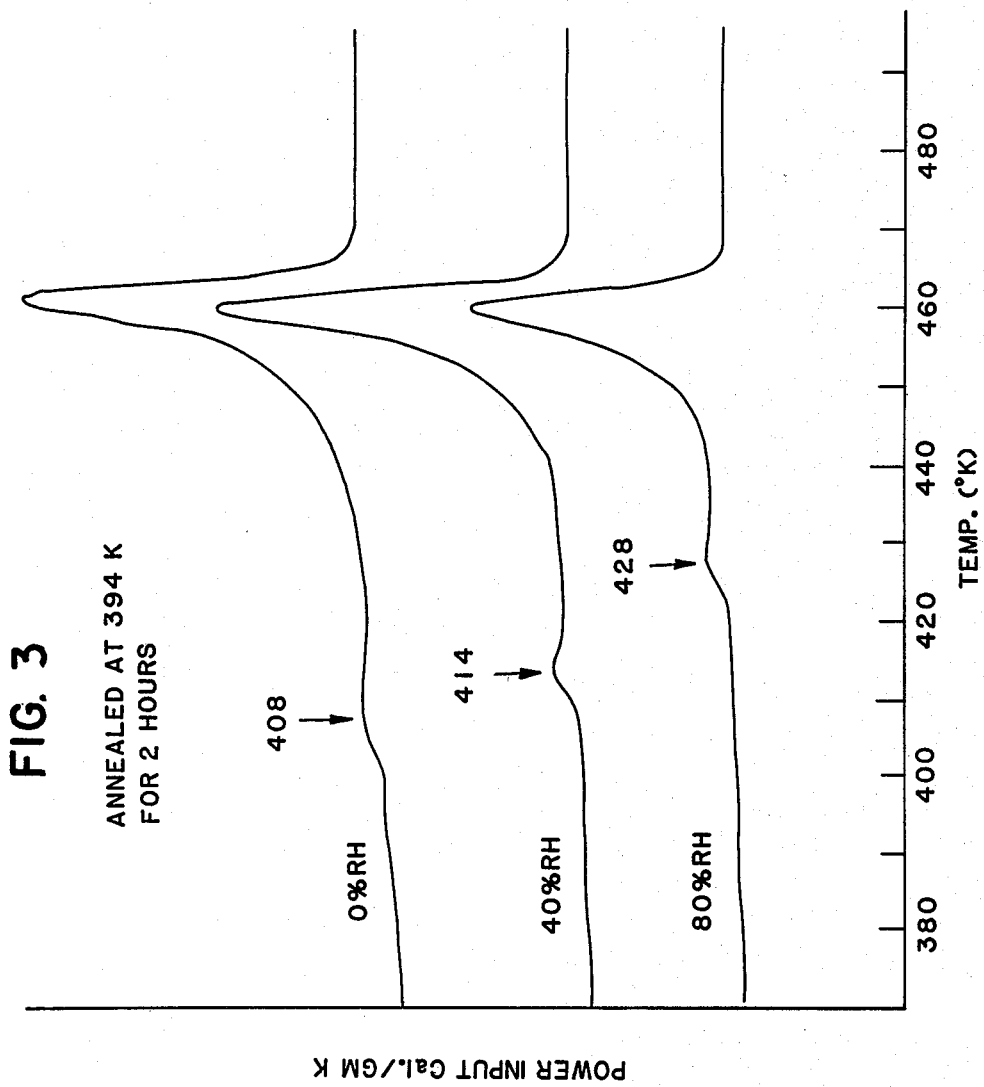
FIG. 3 shows the differential scanning calorimetric curves for a film of ethylene-vinyl alcohol copolymer, illustrating the advantages of wet annealing compared to dry annealing of the film.

Wet annealing of ethylene-vinyl alcohol copolymer film also results in improved oxygen barrier properties as compared with dry annealing as is evident from FIG. 3. As shown by comparing the differential scanning curve of a dry annealed film of ethylene vinyl alcohol copolymer at 394° K. for 2 hours with the same films which have been annealed in the same conditions, but at 40% R.H. and 80% R.H., wet annealing results in higher secondary crystalline melting points than when the film is dry annealed, hence indicating improved crystallinity and oxygen barrier properties.

Figure 4:
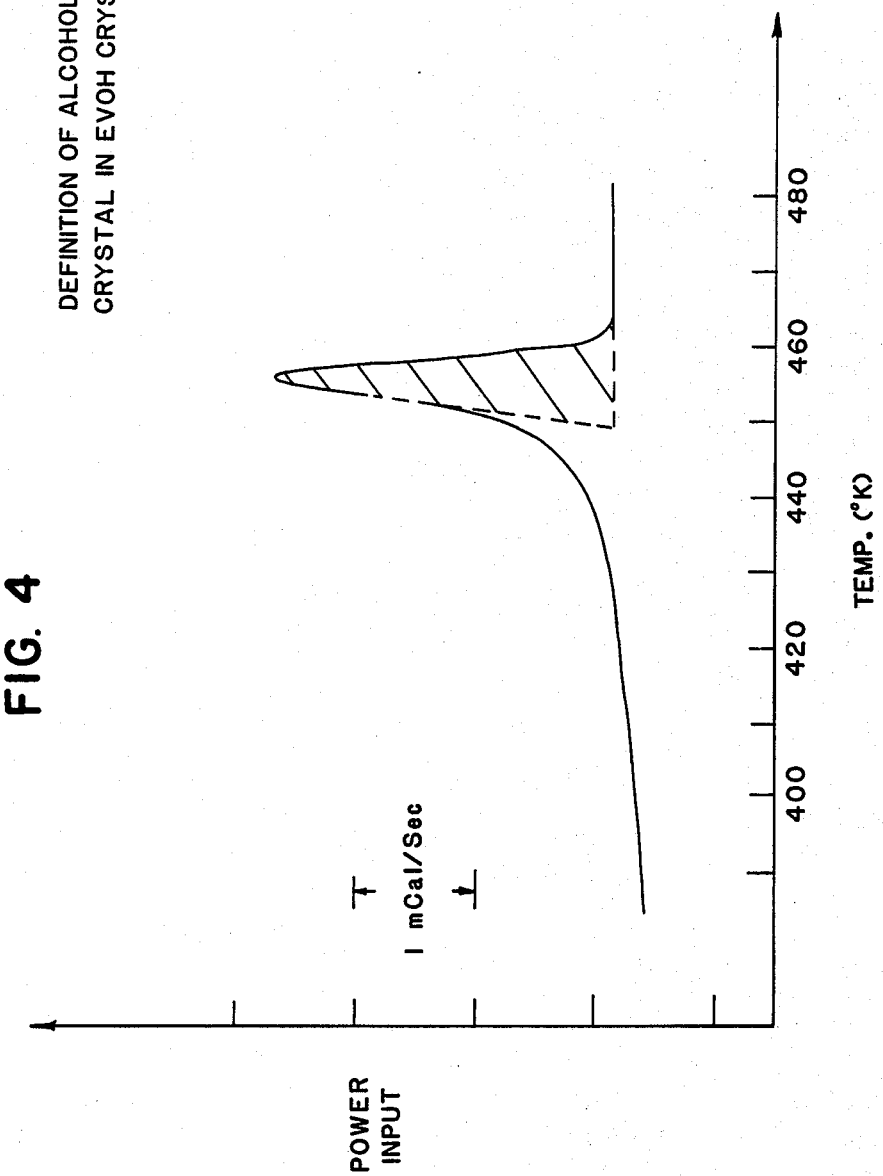
FIG. 4 is a differential scanning calorimetric curve of an ethylene-vinyl alcohol copolymer film illustrating a method for determining the vinyl alcohol-rich crystal content of the film.

In crystalline ethylene-vinyl alcohol copolymer, a portion of the copolymer has higher vinyl alcohol crystalline content than the overall average vinyl alcohol content of the copolymer and a portion which has lesser amount of crystalline vinyl alcohol. FIG. 4 illustrates the manner in which the crystalline amount of the vinyl alcohol-rich content of the copolymer is defined from the differential scanning calorimetric curve. From the shaded area in this figure, it is possible to calculate the heat of fusion which is, in turn, related to the degree of crystallinity.

It has been found that wet annealing increases the amount of the vinyl alcohol-rich crystalline portion of the copolymer and raises the main crystalline melting peak of the copolymers. Consequently, the wet annealed copolymer film or polymeric structure will have improved oxygen impermeability.

The effect of the initial water content of ethylene-vinyl alcohol copolymer film on oxygen impermeability is illustrated in Examples 1 and 2, below wherein laminate structures having the layers and thicknesses listed below and having a dessicant in the adhesive layers were wet annealed and analyzed.

EXAMPLE 1

Figure 5:
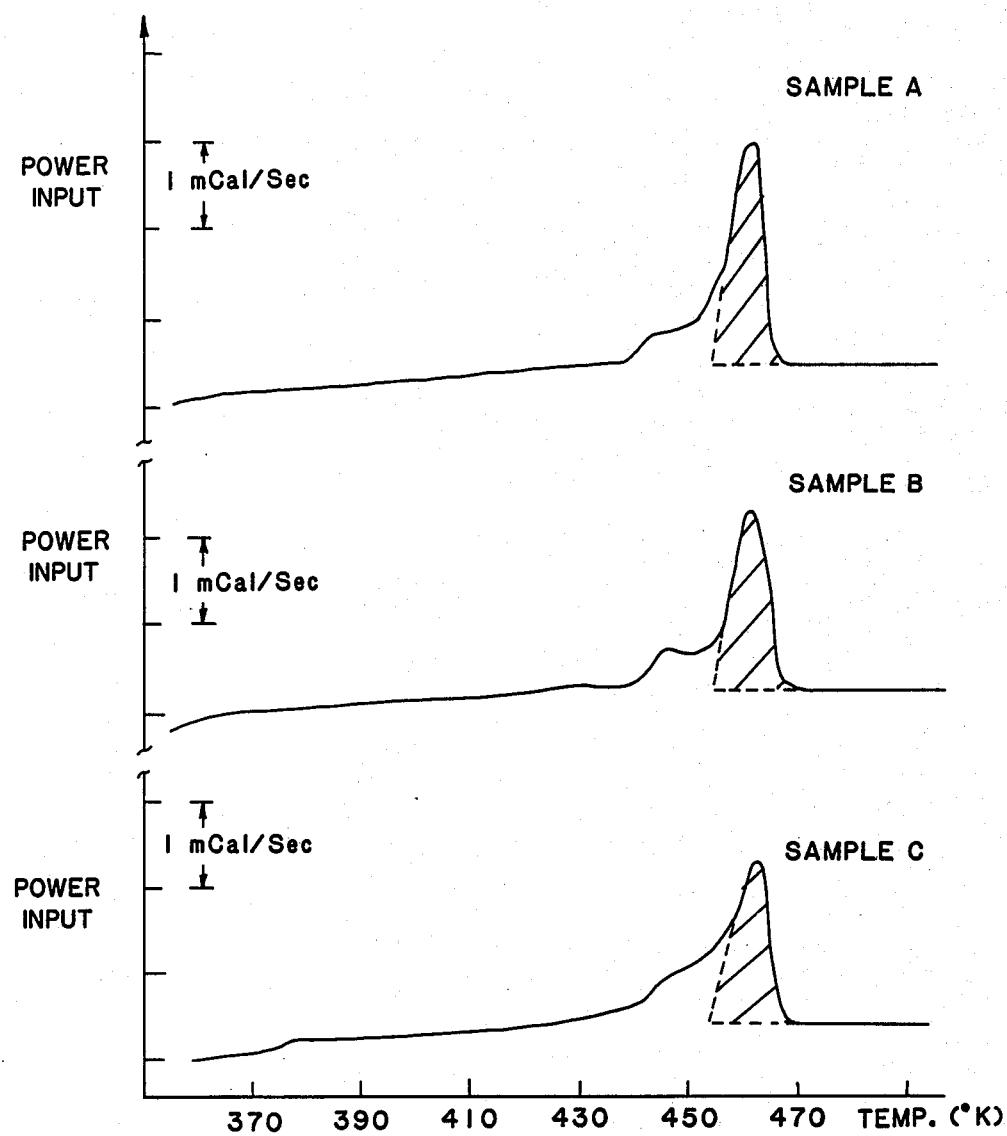
FIG. 5 illustrates the differential scanning calorimetric curves for ethylene-vinyl alcohol copolymer films of varying initial water content, the films having been stripped from wet annealed laminates having sodium chloride (desiccant) in the layer adjacent to the ethylene-vinyl alcohol copolymer film layer.

Three laminate samples each having an ethylene-vinyl alcohol copolymer film of equal thickness, but having a different initial water content, were retorted at 250° F. for 2 hours at 100% R.H. Each adhesive layer of the laminate included 20% (by weight of the adhesive layer) sodium chloride as desiccant. Due to differences in the amount of water initially present in each film, the crystalline structure of each film was different as shown in FIG. 5. The results of these examples are shown in the following table.

TABLE I

| Film Samples | Initial Water Content, Wt % | Heat of Fusion of Alcohol-Rich Crystals, cal/g[(1)] | Oxygen Permeability[(2)] cc.mil/ 100 in.[2] day atm. |
|---|---|---|---|
| A | 0 | 12 | 0.05 |

TABLE I-continued

| Film Samples | Initial Water Content, Wt % | Heat of Fusion of Alcohol-Rich Crystals, cal/g[1] | Oxygen Permeability[2] cc.mil/ 100 in.$^2$ day atm. |
|---|---|---|---|
| B | 7 | 11.4 | 0.075 |
| C | 11 | 9.8 | 0.12 |

[1]Represented by the respective shaded areas in the graphs of FIG. 5.
[2]Measured at 73° F. and 75% R.H.

EXAMPLE 2

Three other laminate samples each having an ethylene-vinyl alcohol copolymer film, each adhesive layer of the laminate having 20% (by weight of the layer) potassium nitrate as a desiccant, were retorted as in Example 1. The results are shown in Table II, below.

TABLE II

| Film Samples | Initial Water Content, Wt % | Heat of Fusion of Alcohol-Rich Crystals,[1] Cal./g | Oxygen Permeability,[2] cc.mil/ 100 in.$^2$ day atm. |
|---|---|---|---|
| D | 0 | 12.4 | 0.04 |
| E | 6.5 | 10.5 | 0.18 |
| F | 10.0 | 9.5 | 0.55 |

Figure 6:
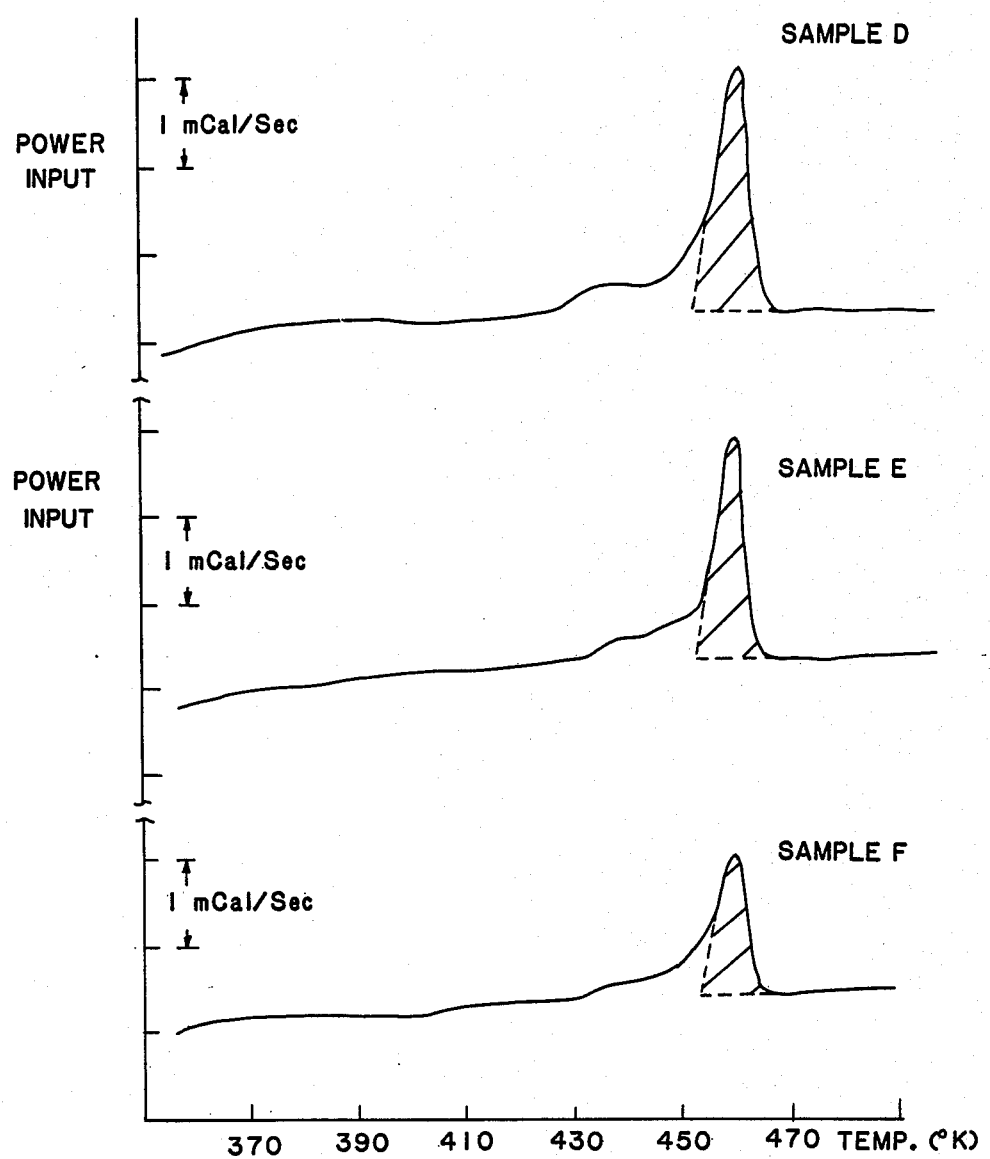
FIG. 6 is similar to FIG. 5, but for using potassium nitrate, as the desiccant and different initial water content in the film.

[1]Represented by the respective shaded areas in the graph of FIG. 6.
[2]Measurement at 93% R.H. and 73% F.

As shown in Tables I and II, the oxygen barrier property of ethylene-vinyl alcohol copolymer improves with increasing degree of crystallinity and larger crystal size of the vinyl alcohol-rich portion of the copolymer, resulting from wet annealing of the film.

As it was previously mentioned, a laminate structure comprising ethylene-vinyl alcohol copolymer or a polyvinyl alcohol polymer can also be wet annealed to improve the oxygen barrier property of the laminate. A typical laminate structure, for example, may consist of the following layers:

| Layer | Thickness, mil |
|---|---|
| High density, polyethylene | 15 |
| Adhesive | 2 |
| High density, polyethylene | 2 |
| Ethylene-vinyl alcohol copolymer | 2 |
| High density polyethylene | 2 |
| Adhesive | 2 |
| High density polyethylene | 15 |

More or less layers may be employed as desired or necessary and a desiccant may be included in the laminate, preferably in the adhesive layer.

In addition to ethylene-vinyl alcohol copolymer, other oxygen barrier materials may be used, which include polyvinyl alcohol and nylon.

Multi-layer polymeric structure comprising a layer of ethylene-vinyl alcohol copolymer are useful as packaging materials for making containers, pouches, bags, and the like. The relative thickness of the various layers will vary based on several considerations including resistance to oxygen permeability, structural integrity and economy. Thus, the ethylene-vinyl alcohol copolymer layer is typically interposed between two structural polyolefin layers such as by coextrusion of the different layers. Suitable polyolefins include polyethylene, polypropylene and a blend of polyethylene with polypropylene. Other structural polymeric layers may be used instead of one or both of the polyolefin layers, depending on the intended use of the multi-layer laminate.

In order to improve inter-layer adhesion or to prevent interlaminar separation, the ethylene-vinyl alcohol copolymer layer may be adhesively bonded to the structural polymer layer. A variety of adhesives have been disclosed and are well known to those skilled in the art for use in multi-layer laminates. These adhesives include modified polyolefins such as those sold by Chemplex Corporation under the name Plexar, and maleic anhydride-modified polypropylene such as those sold under the name ADMER by Mitsui of Japan. Naturally, the choice of adhesive will depend on the particular structural polymer used in making the multi-layer laminate.

What is claimed is:

1. A method of increasing the oxygen resistance of an oxygen barrier film of a polymeric material selected from the group consisting of ethylene-vinyl alcohol copolymer, polyvinyl alcohol and nylon, which comprises heating said film at a temperature of from about 210° to about 250° F. in the presence of a moisture environment of at least about 20% relative humidity while maintaining a low water level in the polymeric material, said film having a low initial water content when the heating step is commenced.

2. A method as in claim 1 wherein said film is made of ethylene-vinyl alcohol copolymer.

3. A method as in claims 1 or 2 wherein said film is heated in an environment of at least 40 percent relative humidity.

4. A method of increasing the oxygen resistance of a polymeric structure comprising a film made of an oxygen barrier polymeric material selected from the group consisting of ethylene-vinyl alcohol copolymer polyvinyl alcohol and nylon, which method comprises heating said structure at a temperature of from about 210° to about 250° F. in the presence of a moisture environment of at least about 20% relative humidity while maintaining a low water level in the polymeric oxygen barrier structure, said polymeric material having a low initial water content when the heating step is commended.

5. A method as in claim 4 wherein said polymeric structure is selected from the group consisting of ethylene-vinyl alcohol copolymer, polyvinyl alcohol and nylon.

6. A method as in claim 4 wherein said polymeric structure is made of ethylene-vinyl alcohol copolymer.

7. A method as in claim 4, 5 or 6 wherein said polymeric structure is heated in an environment of at least 40 percent relative humidity.

8. A method of increasing the oxygen resistance of a multi-layer polymeric structure selected from the group consisting of ethylene-vinyl alcohol copolymer, polyvinyl alcohol and nylon having a moisture sensitive oxygen barrier layer, which method comprises heating said polymeric structure at a temperature of from about 210° to about 250° F. in the presence of a moisture environment of at least about 20% relative humidity while maintaining a low water level in the oxygen barrier layer, said oxygen barrier layer having a low initial water content when the heating step is commended.

9. A method as in claim 8 wherein said barrier layer is made of a polymer selected from the group consisting of ethylene-vinyl alcohol copolymer, polyvinyl alcohol and nylon.

10. A method as in claim 8 wherein said barrier layer is made of ethylene-vinyl alcohol copolymer.

11. A method as in claim 8, 9 or 10 wherein said multi-layer polymeric structure is heated in an environment of at least 40 percent relative humidity.

12. A method as in claim 8, 9 or 10 wherein the maintaining of a low water level in the oxygen barrier layer is effected by employing in said multi-layer polymeric structure a layer with has a dessicant imcorporated therein.

13. A method as in claim 11 wherein the maintaining of a low water level in the oxygen barrier layer is effected by employing in said multi-layer polymeric structure a layer which has a desiccant incorporated therein.

14. A method as in claim 12 wherein said desiccant is incorporated in the layer proximate to the barrier layer.

15. A method as in claim 13 wherein said desiccant is incorporated in the layer proximate to the barrier layer.

16. A method as in claim 12 wherein said desiccant is selected from the group consisting of calcium chloride, sodium phosphate-di-basic, calcium sulfate, potassium sulfite, magnesium sulfate, magnesium chloride, potassium bromide, ammonium phosphate-monobasic, potassium nitrate and sodium chloride.

17. A method as in claim 13 wherein said desiccant is selected from the group consisting of calcium chloride, sodium phosphate-di-basic, calcium sulfate, potassium sulfite, magnesium sulfate, magnesium chloride, potassium bromide, ammonium phosphate-monobasic, potassium nitrate and sodium chloride.

18. A method as in claim 14 wherein said desiccant is selected from the group consisting of calcium chloride, sodium phosphate-di-basic, calcium sulfate, potassium sulfite, magnesium sulfate, magnesium chloride, potassium bromide, ammonium phosphate-monobasic, potassium nitrate and sodium chloride.

19. A method as in claim 15 wherein said desiccant is selected from the group consisting of calcium chloride, sodium phosphate-di-basic, calcium sulfate, potassium sulfite, magnesium sulfate, magnesium chloride, potassium bromide, ammonium phosphate-monobasic, potassium nitrate and sodium chloride.

20. A multi-layer polymeric structure comprising a layer of ethylene-vinyl alcohol copolymer, wherein said copolymer has increased vinyl alcohol-rich crystalline content wherein the oxygen resistance of said ethylene-vinyl alcohol has been increased by heating said structure at a temperature of from about 210° to about 250° F. in the presence of a moisture environment of at least about 20% relative humidity while maintaining a low water level in the copolymer, said structure having a low initial water content when the heating is commenced.

21. Polyvinyl alcohol polymer havng increased vinyl alcohol-rich content and a main crystalline melting peak of at least about 494° K. wherein the oxygen resistant of said polyvinyl alcohol polymer has been increased by heating said polymer at a temperature of from 210° to about 250° F. in the presence of a moisture environment of at least about 20% relative humidity while maintaining a low water level in the polymeric material, said polymer having a low initial water content when the heating step is commenced.

22. The method of claim 1 or 4 wherein the polymeric material has an initial water content of about zero.

23. The method of claim 8 wherein the oxygen barrier layer has an initial water content of about zero.

24. The method of claim 5 wherein the polymeric structure has an initial water content of about zero.

25. The method of claim 9 wherein the barrier layer has an initial water content of about zero.

26. The method of claim 12 wherein the barrier layer has an initial water content of about zero.

27. The method of claim 13 wherein the barrier layer has an initial water content of about zero.

28. The method of claim 14 wherein the barrier layer has an initial water content of about zero.

29. The method of claim 15 wherein the barrier layer has an initial water content of about zero.

30. The method of claim 1 or 4 wherein the polymeric material has an initial water content of below about 6.5 Wt. %.

31. The method of claim 8 wherein the oxygen barrier layer has an initial water content of below about 6.5 Wt. %.

32. The method of claim 5 wherein the polymeric structure has an initial water content of below about 6.5 Wt. %.

33. The method of claim 9 wherein the barrier layer has an initial water content of below about 6.5 Wt. %.

34. The method of claim 12 wherein the barrier layer has an initial water content of below about 6.5 Wt. %.

35. The method of claim 13 wherein the method includes the steps of employing sodium chloride as the dessicant and employing a barrier layer having an initial water content of about 7 Wt. % or less.

36. The method of claim 35 wherein the initial water content is less than 7 Wt. %.

37. The method of claim 36 wherein the initial water content is about zero.

38. The method of claim 35 wherein the heating step is effected by retorting the structure at 250° F. for 2 hours at 100% relative humidity.

39. The method of claim 36 wherein the heating step is effected by retorting the structure at 250° F. for 2 hours at 100% relative humidity.

40. The method of claim 37 wherein the heating step is effected by retorting the structure at 250° F. for 2 hours at 100% relative humidity.

41. The method of claim 13 wherein the method includes the steps of employing potassium nitrate as the dessicant and employing a barrier layer having an initial water content of less than 6.5 Wt. %.

42. The method of claim 41 wherein the method includes the steps of employing potassium nitrate as the dessicant and employing a barrier layer having an initial water content of about zero.

43. The method of claim 41 wherein the heating step is effected by retorting the structure at 250° F. for 2 hours at 100% relative humidity.

44. The method of claim 42 wherein the heating step is effected by retorting the structure at 250° F. for 2 hours at 100% relative humidity.

45. The method of claim 4 wherein the step of maintaining the low water level is effected by incorporating a dessicant in the polymeric structure.

46. The method of claim 8 wherein the step of maintaining the low water level is effected by incorporating a dessicant in a layer of the structure.

47. The method of claim 46 wherein the dessicant is incorporated in a layer proximate the oxygen barrier layer.

48. The method of claim 47 wherein the structure includes one or more adhesive layers and the dessicant is incorporated in the adhesive layer(s) of the structure.

49. The oxygen barrier film of polyvinyl alcohol having increased oxygen resistance by virtue of having been heated in the presence of a moisture environment of at least 20% relative humidity while the film has a low water content, said film thereby having a higher main crystalline melting peak than the film would have if it were not heated, or heated but not in the presence of moisture.

50. The film of claim 49 wherein the main melting peak is at least about 494° K.

51. A polymeric structure comprised of polyvinyl alcohol having increased oxygen resistance by virture of having been heated in the presence of a moisture environment of at least 20% relative humidity while the polyvinyl alcohol had a low water content, said polyvinyl alcohol thereby having a higher main crystalline melting peak than the polyvinyl alcohol would have if it were not heated, or heated but not in the presence of moisture.

52. The film of claim 51 wherein the main melting peak is at least about 494° K.

53. A multi-layer polymeric structure having a moisture sensitive oxyen barrier layer of polyvinyl alcohol having increased oxygen resistance by virtue of the structure having been heated in the presence of a moisture environment of at least about 20% relative humidity while the polyvinyl alcohol has a low water content, said polyvinyl alcohol thereby having a higher main crystalline melting peak than the polyvinyl alcohol layer would have had if it were not heated, or heated but not in the presence of moisture.

54. The multi-layer structure of claim 53 wherein the main melting peak is at least about 494° K. vinyl alcohol copolymers having increased oxygen resistance by 55. The oxygen barrier film of ethylene virtue of having been heated in the presence of a moisture environment of at least about 20% relative humidity while the film had a low water content, said film thereby having a greater vinyl alcohol-rich crystalline portion and a higher secondary crystalline melting peak than the film would have had if it were not heated, or heated but not in the presence of moisture.

56. The film of claim 55 wherein the main melting peak is about 458° K.

57. A polymeric structure comprised of ethylene vinyl alcohol copolymer having increased oxygen resistance by virtue of having been heated in the presence of a moisture environment of at least about 20% relative humidity while the ethylene vinyl alcohol had a low water content, said ethylene vinyl alcohol copolymer thereby having a greater vinyl alcohol-rich crystalline portion than it would have had if it were not heated, or heated but not in the presence of moisture.

58. The film of claim 57 wherein the main melting peak is about 458° K.

59. A multi-layer polymeric structure having a moisture sensitive oxygen barrier layer of ethylene vinyl alcohol copolymer having increased oxygen resistance by virtue of the structure having been heated in the presence of a moisture environment of at least 20% relative humidity while the ethylene vinyl alcohol had a low water content, said ethylene vinyl alcohol copolymer thereby having a greater vinyl alcohol rich crystalline portion and a higher secondary crystalline melting peak than the ethylene vinyl alcohol layer would have had if it were not heated, or heated but not in the presence of moisture.

60. The multi-layer structure of claim 59 wherein the main melting peak is about 458° K.

61. A multi-layer polymeric structure comprising an interior layer of a moisture sensitive oxygen barrier polymer, exterior layers of a structural polymer, and intermediate layers of an adherent polymer between the interior and exterior layers, the intermediate layers containing calcium oxide.

62. A multi-layer polymeric structue comprising an interior layer of a moisture sensitive oxygen barrier polymer, exterior layers of a structural polymer, and intermediate layers of an adherent polymer between the interior and exterior layers, the intermediate layers containing drying agents.

63. A multi-layer polymeric structure comprising an interior layer of a moisture sensitive oxygen barrier polymer, exterior layers of polyolefin, and intermediate layers of an adherent modified polyolefin, the modified polyolefin containing calcium oxide.

64. A multi-layer polymeric structure comprising an interior layer of a moisture sensitive oxygen barrier polymer, exterior layers of polyolefin, and intermediate layers of an adherent modified polyolefin, the modified polyolefin containing drying agents.

65. A multi-layer structure comprising an interior oxygen barrier layer of ethylene-vinyl alcohol, exterior layers of polyolefin, and intermediate layers of adherent modified polyolefin containing calcium oxide.

66. A multi-layer structure comprising an interior oxygen barrier layer of ethylene-vinyl alcohol, exterior layers of polyolefin, and intermediate layers of adherent modified polyolefin containing drying agents.

67. A multi-layer polymeric structure comprising an interior layer of a moisture sensitive oxygen barrier polymer selected from the group consisting of ethylenevinyl alcohol and polyvinyl alcohol, and a layer in which is incorporated calcium oxide and which is proximate to said moisture sensitive layer.

68. A multi-layer polymeric structure comprising an interior layer of a moisture sensitive oxygen barrier polymer selected from the group consisting of ethylenevinyl alcohol and polyvinyl alcohol, and a layer in which is incorporated drying agents and which is proximate to said moisture sensitive layer.

69. A multi-layer polymeric structure comprising an interior layer of a moisture sensitive oxygen barrier polymer, exterior layers of a structural polymer, and an intermediate layer of an adherent polymer between the interior layer and at least one of the exterior layers, the intermediate layer containing calcium oxide.

70. A multi-layer polymeric structure comprising an interior layer of a moisture sensitive oxygen barrier polymer, exterior layers of a structural polymer, and an intermediate layer of an adherent polymer between the interior layer and at least one of the exterior layers, the intermediate layer containing drying agents.

* * * * *